United States Patent [19]

Kamaishi et al.

[11] Patent Number: 5,908,880
[45] Date of Patent: Jun. 1, 1999

[54] COMPOSITION FOR FORMING WATER-PERMEABLE MATERIAL WATER-PERMEABLE MATERIAL AND PROCESS FOR PRODUCING THE SAME

[75] Inventors: Tadami Kamaishi; Hideaki Tanisugi, both of Otsu, Japan

[73] Assignee: Toray Industries, Inc., Tokyo, Japan

[21] Appl. No.: 08/863,783

[22] Filed: May 27, 1997

Related U.S. Application Data

[63] Continuation of application No. 08/199,148, filed as application No. PCT/JP93/00861, Jun. 24, 1993, abandoned.

[30] Foreign Application Priority Data

Jun. 25, 1992 [JP] Japan ..................................... 4-167777

[51] Int. Cl.⁶ ..................................................... C08L 63/00
[52] U.S. Cl. .......................... 523/440; 523/400; 523/443; 525/523; 525/535
[58] Field of Search .................................... 523/400, 442, 523/443, 440; 525/523, 535

[56] References Cited

U.S. PATENT DOCUMENTS 4,126,505  11/1978  Garnish et al. .......................... 156/330
5,143,999   9/1992  Setiabudi et al. ....................... 528/109

FOREIGN PATENT DOCUMENTS 6 1172-901  8/1986  Japan .
6 3186-723  8/1988  Japan .

OTHER PUBLICATIONS

Chemical Abstract, vol. 106, No. 6, Feb. 9, 1987.

*Primary Examiner*—James J. Bell
*Attorney, Agent, or Firm*—Morrison & Foerster LLP

[57] ABSTRACT

A water-permeable material having good chemical resistance, water resistance and weatherability and in which cracks do not form in the material. The composition for forming a water-permeable material includes aggregate grains, a polysulfide-modified epoxy resin and a curing agent for the polysulfide-modified epoxy resin.

10 Claims, No Drawings

COMPOSITION FOR FORMING WATER-PERMEABLE MATERIAL WATER-PERMEABLE MATERIAL AND PROCESS FOR PRODUCING THE SAME

This application is a continuation of application Ser. No. 08/199,148, filed Feb. 25, 1994, now abandoned, filed as PCT/JP93/00861 on Jun. 24, 1993.

TECHNICAL FIELD

The present invention relates to a composition for forming a water-permeable material and process for producing the same. More particularly, the present invention relates to a composition containing aggregate and a resin for forming a water-permeable material, a process for producing the water-permeable material and a method for applying the same.

BACKGROUND ART

Water-permeable materials are recently more and more widely used for forming footpaths, roadways, plazas, dry riverbeds, banks, roofs of buildings, parking spaces, swimming pool sides and the like in order to promote the drainage. Water-permeable materials not only improve environment by virtue of their good drainage, but also have good outer appearances.

These water-permeable materials are in the form of plates and blocks and are produced by molding a composition for forming the water-permeable material, which composition generally comprises aggregate grains, a synthetic resin binder and a curing agent of the synthetic resin binder. The aggregate grains contained in the compositions for forming the water-permeable materials are naturally occurring stones, grains obtained by processing naturally occurring stones, balls made of ceramics such as pottery, spherical sintered grains made of a mixture of wood-containing clay and clay feldspar. As the synthetic resin binder, epoxy resins are generally employed. The epoxy resins employed are those which have glycidyl groups at the end, such as bisphenol A type and bisphenol F type epoxy resins which are copolymers of bisphenol A or bisphenol F and epichlorohydrin. Such a synthetic resin binder is added to the aggregate in an amount that it can just bind the aggregate grains so that the obtained material exhibits water permeability (see, for example, Japanese Laid-open Patent Application (Kokai) Nos. 51-133350, 1-51349 and 2-148003.

The water-permeable materials are generally molded as follows:

(1) Aggregate grains and a curable resin liquid in an amount necessary for binding the aggregate grains are sufficiently mixed;
(2) The obtained composition is spread on a conditioned floor to a uniform thickness using a rake or the like; and
(3) A flat surface is given to the composition using a trowel or the like.

Although the operation using the trowel is similar to that for applying a cement mortar, application of the water-permeable material is different from the application of the cement mortar in that aggregate grains covered with the resin liquid are applied. Since the viscosity of the resin liquid increases with time because of the proceeding of the reaction, the composition adheres to the trowel, so that it is necessary to frequently wipe off the composition using an organic solvent such as a thinner. Thus, it is not practical to carry out the application by a machine.

The water-permeable materials made from the conventional compositions described above have the following drawbacks:

(i) The weatherability is insufficient and the material is deteriorated to become brittle or colored with time. Such deterioration mainly occurs in the regions of epoxy resin used as a binder.
(ii) The material is elongated or shrunk due to the stress given by the repetition of heating and cooling, or to the external load, so that cracks tend to be formed. Although formation of the cracks due to the elongation and shrinkage can be prevented by providing joints, providing joints is troublesome and appearance of the material is also deteriorated.
(iii) The conditions for application of the composition are influenced by the weather, that is, by rain, dew, snow, freezing or the like. As a result, curing may be insufficient or the material may be whitened. In order to avoid such undesired consequences, it is necessary to apply the composition only in good weather. Therefore, the time period necessary for the construction may be prolonged.
(iv) The chemical resistance of the materials is insufficient. Therefore, if an acid, alkali, soft drink such as juice, organic solvent or the like is attached to the material, the material is easily colored or deteriorated.

It is thought that these problems with the water-permeable materials are mainly caused by the synthetic resin binder components.

The conventional method for applying the water-permeable material has the following problems:

(1) When the water-permeable material is applied with a trowel, the resin and the aggregate adhere to the trowel surface. As a result, the slipperiness of the trowel is deteriorated, so that the efficiency of the operation is decreased and the quality of the finishing is poor.
(2) In order to remove the material attached to the trowel surface so as to improve the slipperiness, a thinner (organic solvent) is used. However, use of a thinner presents the following problems:
  (i) Odor and safety.
  (ii) The solvent attached to the surface of the trowel dissolves and flow out the resin on the surfaces of the aggregate grains in the finishing step, so that the binding force of the aggregate grains in the vicinity of the surface is decreased.
  (iii) Spilt organic solvent dissolves the resin on the aggregate grains inside the material, so that the strength of the portion of the layer is decreased and the strength of the material is thus made non-uniform.
  (iv) The solvent from the surface of the trowel dissolves the resin layer in the surface of the material, so that the curing of the resin is delayed. As a result, the viscousness of the surface is retained, so that dusts tend to be attached.
  (v) The solvent is evaporated during operation and the trowel tends to become heavy. Therefore, it is difficult to uniformly slip and press the trowel. As a result, the flatness of the material is not good and the surface of the material is irregular. Thus, the quality of the finishing is poor and the outer appearance is not good.
(3) Because of the above-mentioned (1) and (2), a machine cannot be well used.

The object of the present invention is to make an improvement such that a water-permeable material which has good weatherability and chemical resistance, in which cracks are hardly formed, can be easily produced. Another object is to overcome the above-mentioned problems on the application of the water-permeable material, thereby improving the efficiency of the application and performance of the finished product.

DISCLOSURE OF THE INVENTION

The composition for forming a water-permeable material according to the present invention comprises aggregate grains, a sulfur-modified epoxy resin and a curing agent for the sulfur-modified epoxy resin.

In the composition for forming a water-permeable material according to the present invention, the aggregate grains are, for example, spherical ceramic grains having an average diameter of not more than 1 cm. The sulfur-modified epoxy resin comprises, for example, repeating units of diethylformalpolysulfide.

The process for producing a water-permeable material according to the present invention comprises the steps of:
providing a composition comprising aggregate grains, a sulfur-modified epoxy resin and a curing agent for the sulfur-modified epoxy resin; and
molding the above-mentioned composition into a desired shape and curing the composition.

Aggregate Grains

The aggregate grains used in the present invention are made of a hard metal, a hard inorganic material, a polymer material containing inorganic powder or the like which are known stable materials that do not undergo vigorous chemical reactions such as ignition at room temperature under atmospheric pressure.

Examples of the hard metal materials include iron, nickel-cobalt alloys, stainless steels, brass, copper and aluminum. Examples of the hard inorganic materials include naturally occurring various minerals, stones, gravel, pebbles, jewels, glass, pottery, porcelain, sintered material, concrete and mortar. Examples of the composite materials include those prepared by kneading inorganic fine powder of calcium carbonate, alumina, talc, silica, kaolin, aluminum hydroxide, siliceous sand, carbon, cement, fry ash or the like with a thermoplastic resin such as polyethylene resin, polypropylene resin, polystyrene resin, ethylene-vinyl acetate copolymer resin, polyvinylchloride resin or polyester resin, and by molding the mixture into the form of grains.

The shape of the above-mentioned aggregate grains may preferably be spherical (curved surface) having substantially no edges. Such aggregate grains may preferably have a longer diameter/shorter diameter ratio of about 1–3. The aggregate grains may have more or less irregular portions. Such more or less irregular portions are advantageous for promoting the adhesiveness among the aggregate grains.

The aggregate grains have an average particle size of 0.5–20 mm, preferably 1–10 mm, more preferably 1.5–6 mm. If the average particle size is less than 0.5 mm, the water-permeable material is easily clogged, so that the water-permeablity of the material is decreased. On the other hand, if the average particle size is more than 20 mm, the feeling when walking and outer appearance are deteriorated. When the aggregate grains are not spherical, the average particle size means the average of (longer diameter+shorter diameter)/2.

The above-mentioned aggregate grains may contain a small amount of adhered grains, in which a plurality of individual grains are adhered, that occur during production process of the grains. However, inclusion of such adhered grains in a small amount does not matter.

Two or more types of the above-mentioned aggregate grains may be employed in combination. For example, by mixing aggregate grains made of different materials or having different sizes, shapes, colors and the like, a water-permeable material having a good outer appearance may be obtained.

In order to promote the adhesiveness of the aggregate grains with the resin hereinbelow described, a primer containing an aminosilane, urethane or alkoxysilane may be applied to the aggregate grains.

Epoxy Resin The synthetic resin binder component employed in the present invention is an epoxy resin modified with a sulfur atom. The sulfur-modified epoxy resin is represented by the general formula (1):

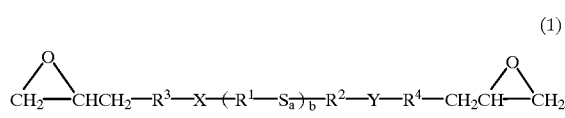

(1)

In the formula, $R^1$ and $R^2$ represent organic groups such as alkylene groups. Examples of $R^1$ and $R^2$ include those represented by the following general formulae:

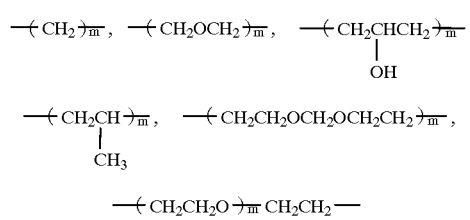

In the above-described general formulae representing $R^1$ and $R^2$, m means an integer of not less than 1. $R^1$ and $R^2$ may be the same organic group or may be the different organic groups. In the above-described general formula (1), $R^3$ and $R^4$ represent residues of an epoxy prepolymer having not less than 2 epoxy groups in one molecule. Examples of $R^3$ and $R^4$ include the residues of the epoxy prepolymers represented by the following general formulae:

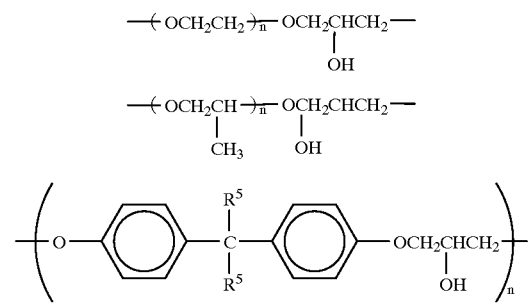

In the above-described general formulae showing $R^3$ and $R^4$, n represents an integer of not less than 1 and $R^5$ represents H or $CH_3$. $R^3$ and $R^4$ may be the same prepolymer residue or may be different prepolymer residues.

In the above-described general formula (1), X and Y represent the following substituent groups:

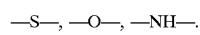

X and Y may be the same group or may be different groups.
In the above-described general formula (1), a represents an integer of 0–5 and b represents an integer of 1–50, with the proviso that when a is 0, at least one of the above-mentioned X and Y is —S— group.

The above-described sulfur-modified epoxy resin may be synthesized by addition reaction between a sulfur-containing polymer or oligomer having a sulfur bond group such as —S— group, —S—S— group, —S—S—S— group, —S—S—S—S— group or —S—S—S—S—S— group and having at its both ends functional groups which can react with epoxy group, such as —OH group, —NH₂ group, —NRH group (R represents an organic group) or —SH, and an epoxy prepolymer having not less than two epoxy groups in one molecule.

As the epoxy prepolymer employed for the synthesis of the polysulfide-modified epoxy resin, those having not less than two epoxy groups in one molecule, which are synthesized by condensation reaction between an aliphatic polyol or an aromatic polyol and epichlorohydrin are employed. Examples of the epoxy prepolymers include epoxy resins of bisphenol types such as bisphenol A type epoxy resins, bisphenol F type epoxy resins and halogenated bisphenol A type epoxy resins, as well as epoxy resins having similar molecular structures to these types of epoxy resins.

In the synthesis, twice or more equivalents of the above-mentioned epoxy prepolymer is reacted with the sulfur-containing polymer or the sulfur-containing oligomer.

Among the polysulfide-modified epoxy resins employed in the present invention, especially preferred are those in which $R^1$ in the general formula (1) is of diethylformal structure of the following formula (2):

$$-(CH_2CH_2OCH_2OCH_2CH_2)_{\overline{m}}-\qquad(2)$$

wherein m represents an integer of not less than 1.

Two or more types of the above-described sulfur-modified epoxy resin may be employed in combination. However, it is preferred to adjust the mixing ratio such that the average of the value a is between 1.5 and 2.5.

Specific examples of the sulfur-modified epoxy resins employed in the present invention include "FLEP"-10, "FLEP-50", "FLEP"-60 and "FLEP"-80 which are commercially available from TORAY THIOKOL CO., LTD.

The sulfur-modified epoxy resins employed in the present invention have better adhesiveness and better chemical resistance than ordinary epoxy resins. Further, since they have specific polysulfide skeleton structures, they have good flexibility and impact resistance. Still further, they are excellent in adhesiveness with metals and inorganic substances (salts of metals). Still further, they exhibit strong adhesiveness with wet surfaces.

Curing Agent

The curing agent used in the present invention is a curing agent for the above-described sulfur-modified epoxy resin.

As such a curing agent, amines and acid anhydrides are mainly employed.

As the curing agent which is an amine, any of room temperature-curing type, medium temperature-curing type and high temperature-curing type may be employed. The curing agent may be a primary amine, secondary amine or a tertiary amine. Specific examples of the amine-based curing agents include aliphatic polyamines such as triethylenetetramine; polyamides such as condensed products of a dimer acid and a polyethylene polyamine; and aromatic polyamines such as m-xylenediamine. Modified polyamines such as adducts of a polyamine and phenylglycidylether or ethyleneoxide are preferred since their volatilities and toxicities are small.

On the other hand, examples of the curing agent which is an acid anhydride include phthalic anhydride, hexahydrophthalic anhydride and chlorendic acid.

Composition

The composition for forming the water-permeable material according to the present invention comprises the above-described aggregate grains, the sulfur-modified epoxy resin and the curing agent. In this composition, the mixing ratio (A/B) of the aggregate grains (A) to the sulfur-modified epoxy resin (B) is adjusted to 100/1–100/25, preferably 100/2–100/15 by volume. If the content of the sulfur-modified epoxy resin is less than the above-mentioned range, the adhesion among the aggregate grains is reduced. On the other hand, if the content of the sulfur-modified epoxy resin is more than the above-mentioned range, the water-permeable material is clogged with the resin, so that the water permeability is reduced.

The composition according to the present invention may comprise other components in addition to the above-mentioned indispensable components. Examples of such other components include resins other than the sulfur-modified epoxy resins, pigments, bulk fillers, reinforcing materials and other components.

Examples of the resins other than the sulfur-modified epoxy resin include resins miscible with the sulfur-modified epoxy resins such as excess epoxy resins other than the sulfur-modified epoxy resins, which were added for synthesizing the sulfur-modified epoxy resins, alkyd resins, polyvinylformal resins, phenol resins, polyvinylacetal resins, urea resins, melamine resins and various aliphatic acids. Epoxy resins which are the same as or different from the epoxy resin that is the starting material for synthesizing the sulfur-modified epoxy resin may be added to the composition.

Examples of the pigment include inorganic fine powders such as talc, calcium carbonate and kaolin; organic fine powders such as polystyrene resins and polyethylene resins; organic and inorganic coloring pigments such as soil, metal powders, lakes, pigment colors and carbon; and soluble dyes such as triphenylmethane-based, anthraquinone-based, and naphthol-based dyes.

Examples of the bulk fillers and the reinforcing materials include inorganic fine powders such as cement powder, silica fume, mica, glass flake and asbestos; fine aggregate; gravel; and fibrous materials such as polyolefin fibers, carbon fibers and glass fibers.

An example of the above-mentioned "other components" is the epoxy monomer which is added in excess when synthesizing the sulfur-modified epoxy resin.

To promote the weatherability of the water-permeable material, a weather stabilizer such as an U.V. absorber may be added to the composition according to the present invention. It should be noted, however, that when a pigment is incorporated in the composition, the pigment can promote the weatherability even if a weather stabilizer is not contained.

Colored powder made of the same material as the aggregate grains may be added to the composition according to the present invention. For example, fine powder (average particle size of not more than 500 μm) of colored ceramic balls may be incorporated. Such fine powder is incorporated in the resin component which binds the aggregate grains and may color the resin regions in the water-permeable materials.

Process for Producing Water-permeable Material

The water-permeable material made from the above-described composition is used for forming those for which water permeability is required, such as footpaths, roadways, plazas, dry riverbeds, banks, roofs of buildings, parking spaces, swimming pool sides and the like. The water-permeable material may be applied in situ at the place under construction or may preliminarily be shaped in the form of plate or block.

When the water-permeable material is produced in situ using the above-described composition, the application surface on which the water-permeable material is to be formed is first provided. The application surface may be a vertical surface, slant surface or a horizontal surface. The material constituting the application surface may preferably be hard soil, stone or concrete. In cases where the application surface is a water-impermeable surface which is not so irregular or is made of a water-permeable concrete or a water-permeable asphalt laminated on a cut stone having a large irregularity, it is preferred to apply a primer on the application surface in order to promote the adhesion between the application surface and the water-permeable material and to prevent deformation of the water-permeable material.

On the above-mentioned application surface, the composition for forming the water-permeable material according to the present invention is placed. In this step, pressure or vibration is given to the composition so that the composition is uniformly spread on the entire application surface. Thereafter, the surface of the composition is uniformly finished by using a metal trowel or the like. The thickness of the applied composition is not less than 3 mm, preferably 5–100 mm, although not restricted. Such a method is known in the art.

The composition thus applied on the application surface is cured by leaving the composition to stand at room temperature or by heating the composition, thereby the water-permeable material is formed.

In cases where the water-permeable material is produced in situ on the application surface, the weather is not critical as long as it is not so harsh as to give physical deformation in the surface of the applied composition. Depending on the weather, however, it is preferred to control the curing rate by adding a curing rate-controller such as a curing promoter or a retarder.

On the other hand, in cases where the water-permeable material is shaped into plate or block, a molding frame is first provided. The molding frame may be made of, for example, an acrylic resin. The size of the molding frame may preferably be $0.5$–$10^{-4}$ m$^3$.

The above-described composition is then poured into the above-mentioned molding frame and is uniformly spread by giving pressure or vibration, followed by curing the composition. After curing, the molding frame is removed to obtain a water-permeable material in the form of a plate or block. The thus obtained water-permeable materials are laid on the above-mentioned application surface.

In some cases, it may be preferred to add various solvents to the composition in order to promote the moldability of the composition and to promote the performance of the water-permeable material. Examples of the solvents to be added include ketones such as methylethyl ketone; esters such as ethyl acetate; chlorinated hydrocarbons such as 1,2-dichloroethane; aromatic solvents such as toluene; and ethers such as diethylether. In cases where the evaporation of the solvent or in cases where it is desired to modify the performance of the water-permeable material, various reactive diluents suited for the particular purpose may be added. An example of the reactive diluent is an epoxy compound having one or more reactive epoxy groups in one molecule.

Method for Applying Water-permeable Material Using Water

The problems in the conventional application method are described above. When the water-permeable composition according to the present invention is used, water may be used in place of the organic solvent such as a thinner, when the composition for forming the water-permeable material, which contains the resin and the aggregate, is applied using a trowel or a finisher.

The water is used such that the water exists at the interface between the surface of the trowel or the finishing surface of the finisher and the resin (covering the surface of the aggregate). More particularly, water is attached to the surface of the trowel or the finishing surface by supplying the water by an appropriate method (application, immersion, sprinkling and spraying) or the water is sprinkled to the surface of the aggregate.

By using water, the friction between the water-permeable material (or the surface of the resin liquid attached to the aggregate) and the surface of the trowel or the finishing surface of the machine is drastically decreased, so that the resin liquid does not become sticky and the slipperiness is drastically improved. Further, by virtue of the good slipperiness of the aggregate mixture, the layer is well tightened so that the flatness of the surface is easily assured.

Although the resin liquid gets sticky with time because of polymerization, since sliding resistance is not felt because of the existence of water, a resin liquid with high viscosity having good performance can be employed.

Unlike a thinner, water is safe and does not elute or dissolve the resin, so that voids are not formed in the applied layer of the water-permeable material and troubles of contamination due to the delay of curing can be avoided.

As the water, clean water, tapped water, rain water, river water and the like may be employed. Even if the water is little turbid due to soil or inorganic materials, it does not matter. Even if a compound which does not adversely affect the used resin liquid, such as a surfactant or a water soluble organic compound such as alcohols or celluloses is contained in the water, it does not matter.

The amount of the water to be used is not restricted because the material to be applied is water-permeable, so that excess water is flowed out. However, the condition under which the resin contacts water during the curing reaction, such as the case where the resin is immersed in water or the curing reaction proceeds under rain for a long time, should be avoided.

Advantageous Features of Water-permeable Material and Method for Applying the Same The water-permeable material made from the composition for forming the water-permeable material according to the present invention has the following advantageous features:

(i) Since the sulfur-modified epoxy resin is used as the resin component, the flexibility and elongation of the resin are large, so that the material well follows deformation. Therefore, cracks are hardly formed, so that it is not necessary to frequently cut joints during the application operation.

(ii) Ease of application is excellent. For example, the composition can be applied even if it rains. This is because that the polysulfide-modified epoxy resin is contained as the resin component, so that the curing rate is hardly decreased by water and deterioration of performance after curing hardly occurs. However, care should be taken that large external force or sustaining external force by water is not exerted during the resin is not cured.

(iii) Even if the material contacts water, the adhesiveness is hardly reduced. The resin regions are hardly whitened and the material is not whitened by dew.

(iv) The material has a good weatherability. Therefore, the material is hardly deteriorated (cracked or colored) with time by various conditions such as weather.

(v) The material has a good chemical resistance. Therefore, the material exhibits excellent resistance to various food solutions, acidic rain, sewage and the like.

(vi) By making water to exist on the surface of the trowel, finishing surface of the finisher and/or on the water-permeable material during the application operation, the operation efficiency is largely promoted and a material with high performance is obtained.

The present invention will now be described in more detail by way of examples.

EXAMPLES

Examples 1–3, Comparative Example 1

Resin compositions having the compositions shown in Table 1 were prepared.

In Table 1, "FLEP"-60 is a sulfur-modified epoxy resin (viscosity: 200 poise (25° C.), sulfur content: 11.2 wt %) commercially available from TORAY THIOKOL, "DAITOCRAL" X 2392 is a modified polyamine curing agent for epoxy resins commercially available from DAITO SANGYO, "FUJICURE" #5420 is a modified polyamine curing agent for epoxy resins commercially available from FUJI KASEI, and "ARALDAITO" XAC5009 and B-1968 are an epoxy resin (viscosity: 19.6 poise (25° C.)) and a curing agent for the epoxy resin, respectively, commercially available from NIPPON CIBA GEIGY.

Each of the obtained resin compositions was mixed with green ceramic balls having an average particle size of 2 mm (commercially available from SHIBATA TOKI, maximum diameter: 3 mm) such that the entire surfaces of the balls are wetted. The mixing ratio of the resin composition (A) to the ceramic balls (B) was A:B=6:100 by weight. By this operation, compositions for forming water-permeable material were obtained.

TABLE 1

| | Main Component | | Curing | | Viscosity |
|---|---|---|---|---|---|
| | Resin | Diluent | Agent | Solvent | (poise) |
| Example 1 | FLEP-60 (100) | — | DAITOCRAL X2392(28) | Xylene (2) | 211 |
| Example 2 | FLEP-60 (87) | Phenylglycidyl-ether (13) | FUJICURE #5420 (30) | — | 46 |
| Example 3 | FLEP-60 (100) | — | DAITOCRAL X2392(28) | Xylene-methylene chloride Mixture* (25) | 8 |
| Comparative Example 1 | ARALDAITO XA C5009(100) | — | B-1968 (40) | — | 9 |

*: Xylene/methylene chloride (w/w) = 1/1
Values in parentheses indicate parts by weight.

Each of the thus obtained compositions for forming water-permeable material was poured into a molding frame made of an acrylic resin sizing 12.8 cm×7.8 cm×1.0 cm, and the composition was uniformly spread using a trowel. The compositions were left to stand until the next day to cure the resins. The cured products were removed from the molding frames to obtain water-permeable materials in the form of plate.

The thus obtained water-permeable materials were left to stand at 20° C. for 7 days and then bending strengths and Charpy impact strengths were measured. The bending strengths were measured according to JIS-R-5201 before and after immersing the materials in 10% sulfuric acid. The materials were immersed in 10% sulfuric acid at room temperature for 1 week. The Charpy impact strength was measured in accordance with JIS-K-7111-1977. The results are shown in Table 2.

TABLE 2

| | Bending Strength (at maxium load) | | Bending Strength after Immersion in 10% Sulfuric Acid (at maximum load) | | Charpy Impact Strength |
|---|---|---|---|---|---|
| | Bending Strength (Kg/cm$^2$) | Strain (mm) | Bending Strength (Kg/cm$^2$) | Strain (mm) | Strength (Kg · cm/cm$^2$) |
| Example 1 | 94.3 | 1.30 | 91.0 | 1.27 | 0.98 |
| Example 2 | 90.2 | 1.15 | — | — | 0.84 |
| Example 3 | 68.2 | 2.58 | — | — | 1.58 |
| Comparative Example 1 | 86.8 | 0.40 | 76.8 | 0.33 | 0.76 |

As is apparent from Table 2, the water-permeable materials obtained in the examples of the present invention have good bending strengths, impact strengths and resistances to acid. It should be noted that the strains of the bending strengths of the materials according to the examples are larger than that of the material according to the comparative example. This shows that the water-permeable materials according to the present invention are flexible and are resistant to cracking, breaking and chipping.

Examples 4–7, Comparative Example 2

Resin compositions having the compositions shown in Table 3 were prepared.

TABLE 3

| | Main Component | | Curing | | Amount of Added Water |
|---|---|---|---|---|---|
| | Resin | Diluent | Agent | Solvent | Wt % |
| Example 4 | FLEP-60 (90) | Phenylglycidyl-ether (10) | FUJICURE #5420 (29.3) | Xylene (6.8) | 0 |
| Example 5 | FLEP-60 (90) | Phenylglycidyl-ether (10) | FUJICURE #5420 (29.3) | Xylene (6.8) | 10 |
| Example 6 | FLEP-60 (90) | Phenylglycidyl-ether (10) | DAITOCRAL x2392(29) | — | 0 |
| Example 7 | FLEP-60 (90) | Phenylglycidyl-ether (10) | DAITOCRAL x2392(29) | — | 10 |
| Comparative Example 2 | ARALDAITO XA C5009(100) | — | B-1968 (40) | — | 10 |

Values in parentheses indicate parts by weight.

Each component shown in Table 3 is the same as that shown in Table 1.

Each of these resin compositions was mixed with the ceramic balls used in Examples 1–3. To the compositions according to Examples 5 and 7, and Comparative Example 2, water was further added. By this operation, compositions for forming water-permeable material were obtained. The amount of the added ceramic balls was the same as in Examples 1–3.

Each of the thus obtained compositions for forming water-permeable material were poured into the molding frame used in Examples 1–3 and the compositions were left to stand for 24 hours to cure the resins. The cured products were removed from the molding frames to obtain water-permeable materials in the form of plate.

The obtained water-permeable materials were tested for the bending strength as in Examples 1–3. The results are shown in Table 4.

TABLE 4

| | Bending Strength (at maxium load) | | Bending Strength after Immersion in 10% Sulfuric Acid (at maximum load) | |
|---|---|---|---|---|
| | Bending Strength ($Kg/cm^2$) | Strain (mm) | Bending Strength ($Kg/cm^2$) | Strain (mm) |
| Example 4 | 95.6 | 1.07 | 83.5 | 1.00 |
| Example 5 | 89.6 | 0.90 | 91.1 | 1.07 |
| Example 6 | 66.4 | 2.67 | 73.3 | 1.87 |
| Example 7 | 75.6 | 1.33 | 78.1 | 1.50 |
| Comparative Example 2 | 75.5 | 0.57 | 18.0 | 0.43 |

No differences in outer appearance were observed between the compositions according to the examples of the present invention to which water was added and the compositions according to the examples of the present invention to which water was not added. In contrast, in the material obtained in Comparative Example 2, resin regions were partly whitened and the resistance to acid was extremely poor.

Examples 8 and 9

In molding the compositions for forming water-permeable material according to Examples 1 and 2, water was used in place of a petroleum-based thinner in order to improve the slipperiness of the trowel and to make it easy to remove the ceramic balls attached to the trowel in the molding operation. Ease of handling of the trowel was the same as in the case wherein the thinner was used, and no whitening of the water-permeable material was observed after leaving the composition to stand for 1 week. From this, it was confirmed that the whitening phenomenon does not occur even if water is used.

Example 10

Using the resin liquids used in Example 2 (FLEP series, viscosity: 46 poises) and in Comparative Example 1 (ARALDAITO series, viscosity: 9 poise), and using the ceramic balls as aggregate, compositions for forming water-permeable material were prepared. The obtained compositions were applied on asphalt pavement to a thickness of the water-permeable material of 10 mm, and the application processes were compared.

In the case of the composition according to Example 2 (FLEP series), water was used for wiping the trowel and water was sprinkled on the composition during finishing. In spite of the fact that the viscosity of the resin was as high as 46 poise, the trowel could be moved fluently and could be used easily. Further, the finished layer was well tightened and had good flatness. On the other hand, in case of the composition according to Comparative Example 1, a petroleum-based thinner was used for wiping the trowel. Although at the beginning, the ease of handling of the trowel was the same as mentioned above, the trowel got heavy to move with time in spite of the low viscosity as low as 9 poise, so that the thinner was frequently used. The whitening of the material was not observed in the material prepared by using the composition of Example 2. In contrast, the entire surface of the material prepared by using the composition of Comparative Example 1 was whitened by dew and its strength was decreased.

INDUSTRIAL AVAILABILITY

The water-permeable material according to the present invention excels in chemical resistance and water resistance, and cracks are hardly formed therein. The material is also resistant to acidic rain. Therefore, the water-permeable material according to the present invention may be widely used for creating amenity spaces in hot spring resorts, sea shores and swimming pools.

Since water, not an organic solvent, is used in molding, the operation is preferable from the viewpoint of hygiene, and the efficiency of the application operation is high. In addition, the quality of the water-permeable material is also high. Therefore, wide use of the composition according to the present invention is expected.

We claim:

1. A composition for forming a water-permeable material, said composition comprising aggregate grains, at least one sulfur-modified epoxy resin, and a curing agent for said sulfur-modified epoxy resin, wherein said aggregate grains are naturally occurring stones and/or spherical ceramic balls, which have an average particle size of 0.5–20 mm and further wherein the ratio of the aggregate grains to said sulfur-modified epoxy resin is 100:1 to 100:25.

2. The composition for forming a water-permeable material according to claim 1, wherein said sulfur-modified epoxy resin contains repeating units of diethylformal polysulfide.

3. The composition for forming a water-permeable material according to claim 1, wherein the mixing ratio (A/B) of said aggregate grains (A) to said sulfur-modified epoxy resin (B) is 100/2–100/15 by volume.

4. A water-permeable material comprising aggregate grains, and a cured resin resulting from curing of a composition containing a sulfur-modified epoxy resin and a curing agent for said sulfur-modified epoxy resin.

5. The composition for forming a water-permeable material, according to claim 1, wherein said at least one sulfur-modified epoxy resin is represented by formula (I):

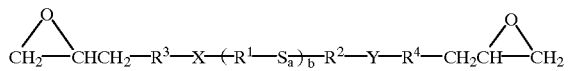

(1)

wherein $R^1$ and $R^2$ represent organic groups; $R^3$ and $R^4$ represent epoxy prepolymer derivatives having not less than two epoxy groups per molecule; X and Y may be the same or different and are each independently selected from the group consisting of S, O, and NH; a represents an integer of 0 to 5 with the average value of a for the resin(s) being between 1.5 and 2.5, and b represents an integer of 1 to 50; provided that when a is 0, at least one of X and Y is S.

6. The composition for forming a water-permeable material according to claim 5, wherein $R^1$ and $R^2$ each independently represents an alkylene group.

7. A water permeable material formed by curing a composition comprising aggregate grains, at least one sulfur-modified epoxy resin, a curing agent, and water;

wherein said aggregrate grains have an average particle size of 0.5–20 mm and comprise materials that are non-flammable at room temperature under atmospheric pressure; and wherein the ratio of the aggregate grains to said sulfur-modified epoxy resin is 100:1 to 100:25.

8. A composition for forming a water-permeable material according to claim 1, wherein in said sulfur-modified epoxy resin there are at least two adjacent sulfur atoms.

9. A composition for forming a water-permeable material according to claim 1, further comprising water.

10. A water permeable material formed by curing the composition according to claim 1.

* * * * *